(12) United States Patent
Raw et al.

(10) Patent No.: US 10,112,750 B2
(45) Date of Patent: Oct. 30, 2018

(54) BEVERAGE CONTAINER SEALING SYSTEM (71) Applicant: Anheuser-Busch, LLC, St. Louis, MO (US)

(72) Inventors: Timothy T. Raw, Okawville, IL (US); Susan Jones, Valley Park, MO (US); Matthew Vincent, Chesterfield, MO (US); Tim O'Leary, Edwardsville, IL (US); Donald Hutchinson, Troy, IL (US); Zane Pinckney, Bridgeton, MO (US); Rodney Borger, Belleville, IL (US); Paul Cobet, Wildwood, MO (US); Kendra Bowen, Fenton, MO (US); Thomas Tweedy, St. Louis, MO (US); Chester J. Grohs, IV, Hillsboro, MO (US)

(73) Assignee: Anheuser-Busch, LLC, St. Louis, MO (US)

( * ) Notice: Subject to any disclaimer, the term of this patent is extended or adjusted under 35 U.S.C. 154(b) by 387 days.

(21) Appl. No.: 14/979,328

(22) Filed: Dec. 22, 2015

(65) Prior Publication Data
US 2016/0107811 A1 Apr. 21, 2016

Related U.S. Application Data (62) Division of application No. 13/769,496, filed on Feb. 18, 2013, now Pat. No. 9,248,943.
(Continued)

(51) Int. Cl.
B65D 41/12 (2006.01)
B65D 51/24 (2006.01)
(Continued)

(52) U.S. Cl.
CPC .............. *B65D 51/244* (2013.01); *A23L 2/46* (2013.01); *B65B 55/02* (2013.01); *B65D 41/00* (2013.01);
(Continued)

(58) Field of Classification Search
CPC .. B65D 41/105; B65D 41/125; B65D 81/267; B65D 41/12; B65D 51/244;
(Continued)

(56) References Cited

U.S. PATENT DOCUMENTS 1,711,469 A 4/1929 Stratford
2,237,636 A 4/1941 Schmutzer
(Continued)

FOREIGN PATENT DOCUMENTS

WO WO-2002061013 A1 8/2002
WO WO-2006134652 A1 12/2006
WO WO-2011069520 A1 6/2011

OTHER PUBLICATIONS

Colorcon: "Harmonize Globally" company information sheet, printed Oct. 17, 2012, http://www.colorcon.com/ (1 pg).
(Continued)

*Primary Examiner* — Drew E Becker
(74) *Attorney, Agent, or Firm* — Foley & Lardner LLP (57) ABSTRACT A system for sealing a beverage container includes a crown defining a bottom surface. A liner that includes an oxygen scavenger is coupled to the crown such that a top surface of the liner contacts the bottom surface of the crown. The bottom surface of the liner supports printed indicia where the bottom surface of the liner and the printed indicia are exposed to a beverage contained in the beverage container.

15 Claims, 3 Drawing Sheets

Related U.S. Application Data (60) Provisional application No. 61/600,601, filed on Feb. 18, 2012.

(51) Int. Cl.
| | |
|---|---|
| *B65D 41/00* | (2006.01) |
| *B65B 55/02* | (2006.01) |
| *C12H 1/20* | (2006.01) |
| *B65D 41/10* | (2006.01) |
| *B65D 41/14* | (2006.01) |
| *B65D 41/08* | (2006.01) |
| *B65D 41/04* | (2006.01) |
| *B65D 41/02* | (2006.01) |
| *A23L 2/46* | (2006.01) |
| *B65D 81/26* | (2006.01) |

(52) U.S. Cl.
CPC ......... *B65D 41/005* (2013.01); *B65D 41/023* (2013.01); *B65D 41/0407* (2013.01); *B65D 41/086* (2013.01); *B65D 41/105* (2013.01); *B65D 41/12* (2013.01); *B65D 41/125* (2013.01); *B65D 41/145* (2013.01); *B65D 51/245* (2013.01); *B65D 81/267* (2013.01); *C12H 1/20* (2013.01)

(58) Field of Classification Search
CPC ....... B65D 51/245; B65D 41/00–41/28; C12H 1/20; A23L 2/46; B65B 55/02; A23P 2001/089
See application file for complete search history.

(56) References Cited

U.S. PATENT DOCUMENTS

| | | | |
|---|---|---|---|
| 2,892,718 A | 6/1959 | Stone | |
| 3,002,641 A | 10/1961 | Normandy | |
| 3,233,770 A | 2/1966 | Waters | |
| 3,257,021 A | 6/1966 | Brockett | |
| 3,312,365 A | 4/1967 | Balint | |
| 3,361,281 A | 1/1968 | Kehe | |
| 3,547,746 A | 12/1970 | Gwinner | |
| 3,581,690 A | 6/1971 | Zapata | |
| 3,616,954 A | 11/1971 | Peck | |
| 3,633,781 A | 1/1972 | Zapata | |
| 3,705,122 A * | 12/1972 | Gwinner | B29C 43/18 524/313 |
| 4,151,924 A | 5/1979 | Jameson | |
| 4,157,143 A | 6/1979 | Doi | |
| 4,287,995 A | 9/1981 | Moriya | |
| 4,310,100 A | 1/1982 | Kunimoto et al. | |
| 4,327,840 A | 5/1982 | Mori et al. | |
| 4,372,457 A | 2/1983 | Kunimoto et al. | |
| 4,536,409 A | 8/1985 | Farrell et al. | |
| 4,723,678 A * | 2/1988 | Kollen | B65D 41/045 215/347 |
| 4,789,074 A | 12/1988 | Han | |
| 4,840,280 A | 6/1989 | Schvester | |
| 5,005,719 A | 4/1991 | Phillips et al. | |
| 5,106,866 A | 4/1992 | Maeda et al. | |
| 5,143,763 A | 9/1992 | Yamada et al. | |
| 5,542,557 A | 8/1996 | Koyama et al. | |
| 5,592,766 A | 1/1997 | Mygatt | |
| 5,663,223 A | 9/1997 | Teumac et al. | |
| 5,839,593 A | 11/1998 | McKedy | |
| 5,863,964 A | 1/1999 | Teumac et al. | |
| 6,007,885 A | 12/1999 | Hallock | |
| 6,139,935 A | 10/2000 | Cullen et al. | |
| 6,387,461 B1 | 5/2002 | Ebner et al. | |
| 6,740,374 B2 | 5/2004 | Carballido | |
| 7,704,407 B2 * | 4/2010 | Makino | B65D 41/3423 252/188.21 |
| 7,832,075 B2 | 11/2010 | De Guerry et al. | |
| 8,220,653 B2 | 7/2012 | Carballido | |
| 8,502,850 B2 | 8/2013 | Mesropyan et al. | |
| 2002/0004090 A1 | 1/2002 | Lafleur | |
| 2005/0173370 A1 | 8/2005 | Odet et al. | |
| 2006/0011892 A1 * | 1/2006 | Powers | B32B 27/06 252/397 |
| 2007/0045312 A1 * | 3/2007 | Abercrombie, III | B65D 81/2046 220/212 |
| 2007/0172557 A1 | 7/2007 | Simpson | |
| 2007/0241308 A1 | 10/2007 | Uradnisheck | |
| 2007/0281245 A1 | 12/2007 | Overend et al. | |
| 2009/0226651 A1 | 9/2009 | Chisholm et al. | |
| 2010/0193389 A1 | 8/2010 | Nielsen | |
| 2010/0264110 A1 | 10/2010 | Sumimiya et al. | |
| 2011/0217430 A1 | 9/2011 | Chau et al. | |
| 2011/0290757 A1 | 12/2011 | Purdy | |
| 2012/0031795 A1 | 2/2012 | von Glasow | |
| 2013/0041087 A1 | 2/2013 | Coulter et al. | |
| 2014/0234500 A1 * | 8/2014 | Mitchell | A23P 1/085 426/302 |
| 2015/0118366 A1 * | 4/2015 | Bonnel | C09K 3/10 426/106 |

OTHER PUBLICATIONS

Colorcon: "Printing Inks" summary page, printed Oct. 17, 2012, http://www.colorcon.com/products/printing-inks (1 pg).

Colorcon: "No-Tox Edimark(r)—No-Tox Edible Ink," printed Oct. 17, 2012, http://www.colorcon.com/products/printing-inks/edimark (1 pg).

Colorcon: "Inks with FDA Approved Components from Colorcon No-Tox Products," printed Oct. 17, 2012, http://www.colorcon.com/notox/home (1 pg).

Colorcon: "No-Tox Liquid Inks," printed Oct. 17, 2012, http://www.colorcon.com/notox/products/ntli (1 pg).

Colorcon: "No-Tox(r) Inkjet," printed Oct. 17, 2012, http://www.colorcon.com/notox/products/ntli/inkjet (1 pg).

Colorcon: "Make Colorcon Your Pharmaceutical Supplier of Choice," printed Oct. 17, 2012, http://www.colorcon.com/about (1 pg).

Colorcon: "No-Tox Edimark(r) (Ink Jet Printing System)," No-Tox Products Technical Data Sheet dated Feb. 2012 (1 pg).

International Search Report and Written Opinion for PCT/US2013/026586 dated Apr. 29, 2013 (8 pages).

International Preliminary Report on Patentability for Co-Pending PCT Application No. PCT/US2013/026586 dated Jun. 10, 2014, 45 pgs.

* cited by examiner

BEVERAGE CONTAINER SEALING SYSTEM

CROSS REFERENCE TO RELATED APPLICATIONS

This application is a divisional of and claims priority from, and hereby incorporates by reference for all purposes, U.S. patent application Ser. No. 13/769,496, entitled "Container Closure," filed on Feb. 18, 2013, issued as U.S. Pat. No. 9,248,943, which is a non-provisional of U.S. Provisional Patent Application Ser. No. 61/600,601, entitled "Improved Shelf Life Composition," and filed Feb. 18, 2012.

TECHNICAL FIELD

This invention relates to closures for container openings, and more particularly, to closures, such as crowns, including a liner with an oxygen scavenger.

BACKGROUND OF THE DISCLOSURE

Figures 1, 2:
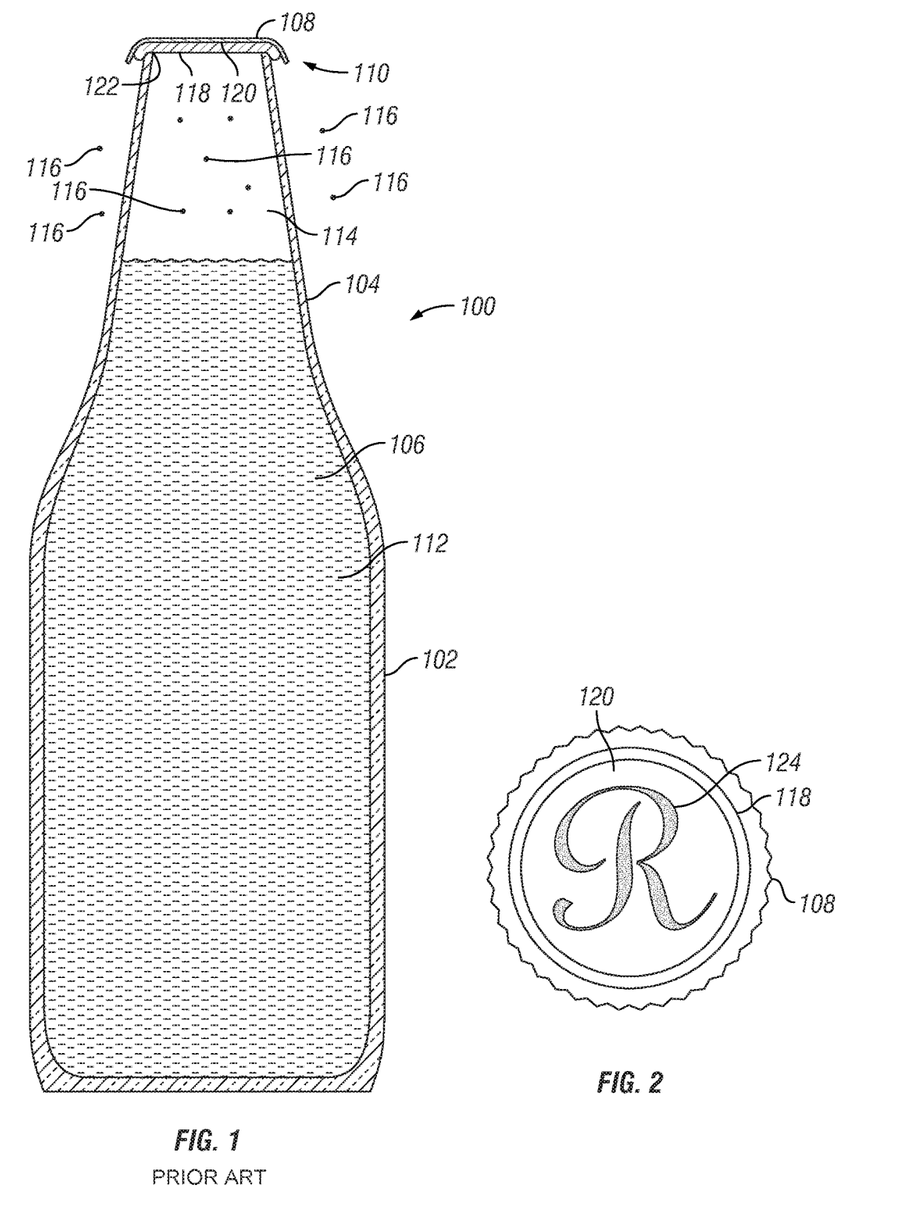
FIG. 1 is front section view of a container including a crown and a liquid in an interior volume of the container.
FIG. 2 is a bottom view of a crown including a liner and printed material.

Referring to FIGS. 1 and 2, a beverage container 100 often includes a body 102, a neck 104 and an internal volume 106. The internal volume 106 of the container 100 is often sealed by a crown 108 that is connected to a top portion 110 of the neck 104 to close off the internal volume 106 of the container 100 until a liquid 112, for example, water, beer, soda, or some other fluid, in the container is to be consumed. The container 100 and crown 108 may be made of many types of materials. In the case of a typical container 100 for beer, for example, a glass container 100 is sealed by fastening a metal crown 108 to the top portion 110 of the neck 104.

The internal volume 106 is often only partially filled with the liquid 112 so that a portion of the internal volume 106 does not include the liquid 112. The portion of the internal volume 106 that is not filled with the liquid 112 is often called the headspace 114. The headspace 114 is located near the crown 108 when the container 100 is in an upright position, as shown in FIG. 1, and may contain oxygen 116, nitrogen, another gas or a mixture of gases, depending on the technique used to fill and seal the container 100. For some liquids 112, the shelf life of the liquid 112 is influenced by the gases contained in the headspace 114. For example, the shelf life of beer is negatively affected by oxygen 116 in the headspace 114.

Modern container filling techniques insert a predetermined amount of liquid 112 into the internal volume 106 while limiting the amount of oxygen 116 in the headspace 114 when the container 100 is sealed. For example, in some techniques oxygen 116 is removed from the headspace 114 by a vacuum just prior to sealing the crown 108 to the container 100. Other techniques include removing the oxygen 116 by inert gas sparging or a combination of a vacuum and inert gas sparging. However, these filling techniques have not been able to completely eliminate all oxygen 116 from the headspace 114 and total package oxygen ranging from about 30 ppb to about 1000 ppb often remain in the container 100.

In addition, oxygen 116 from the atmosphere surrounding the container 100 may enter the headspace 114 by passing between the crown 108 and the container 100. To reduce and/or prevent oxygen 116 from entering the headspace 114 in this manner and to further seal the liquid 112 in the container 100, one or more liners 118 are often attached to a bottom surface 120 of the crown 108 so as to be located between the crown 108 and the container opening 122 when the crown 108 is sealed to the container 100. Liners 118 are often made of a resilient, deformable material that allows the liner 118 to be compressed between the crown 108 and the container opening 122 when the crown 108 and liner 118 are secured to the container 100.

The liner 118 may include an oxygen scavenger that absorbs oxygen 116 that penetrates the liner 118. For example, U.S. Pat. No. 5,663,223 ("'223 Patent") describes the deleterious effects of oxygen 116 on flavor and shelf life for certain liquids 112 and identifies a liner 118 containing an oxygen scavenger as an approach to ameliorate the problem. The '223 patent discloses a liner composition designed to protect beer or other flavor sensitive liquids 112 from oxygen 116 which permeates into the container 100 through the liner 118. The '223 Patent proposes a liner 118 composition comprising oxygen scavengers wherein at least two oxygen scavengers are used. Sodium sulfite is disclosed in the '223 patent as a known oxygen scavenger and the '223 patent discloses compositions containing not more than 5% by weight sodium sulfite with at least one additional oxygen scavenging compound. According to the '223 Patent, the compositions disclosed therein provide a flavor that is protected up to 16 days.

The '223 Patent discloses the results of the recommended compounds with an initial total package oxygen between 200 and 400 ppb and notes that it would be desirable to achieve an initial total package oxygen below 50 ppb. With modern filling techniques, initial total package oxygen of less than 50 ppb is achievable without use of an oxygen scavenger. It would be expected that as initial total package oxygen decreases, the amount of oxygen scavenger necessary to provide the same shelf life extension would be lower. Unexpectedly, it has been found that this is not the case.

In addition, many beverages and beverage containers 100 are pasteurized to reduce the amount of unwanted biological contaminants. The '223 Patent does not discuss removing oxygen 116 from the headspace 114 during pasteurization or the effect of doing so. It has been found that the amount of oxygen 116 removed from the headspace 114 during pasteurization can have a significant impact on the shelf life of the liquid 112. In sum, it has been discovered that, while the compounds of the '223 Patent are beneficial, they are not adequate in situations where protection much longer than 16 days is desired.

Referring now to FIG. 2, beverage manufacturers often desire to place printed material 124, for example, advertisements and/or promotions, on a bottom surface 120 of the crown 108. The advertisements are visible to the user when the crown 108 is removed from the container 100. These advertisements and promotions are often printed directly on a metal crown 108, on a varnish on the metal crown 108 or between layers of a multi-layer liner 118. It has been discovered, however, that advertisements and other printed material placed under a liner that contains an oxygen scavenger are often difficult read and become obscured as the liner absorbs oxygen 116. Thus, a new printing method is required for liners containing oxygen scavengers.

SUMMARY

In a first aspect, a crown system includes a crown having a top surface and a bottom surface and a liner having a top surface and a bottom surface, wherein the top surface of the liner contacts the bottom surface of the crown and the liner includes at least about 2.2 micromoles of sodium sulfite per cubic millimeter in a volume of the liner to a depth of about 0.003 millimeters from a bottom surface of the liner. In certain embodiments, an ink is printed on the bottom surface of the liner. In other certain embodiments, the ink is a pigment-based ink. In yet another embodiment, the ink is a direct food contact ink. In still another embodiment, the bottom surface of the liner includes a texture to increase the surface area of the bottom surface of the liner. In some embodiments, the liner includes between about 2.2 micromoles and 13.2 micromoles of sodium sulfite per cubic millimeter in a volume of the liner to a depth of about 0.003 millimeter from a bottom surface of the liner.

In a second aspect, a liner includes a base formula that includes PVC, a plasticizer, a stabilizer and a blowing agent, and the liner also includes at least six weight percent sodium sulfite and less than eighteen weight percent sodium sulfite. In certain embodiments, the sodium sulfite is micronized so that the diameter of the particles of sodium sulfite range from about 20 to about 80 micrometers in diameter. In other certain embodiments, the liner includes at least about 2.2 micromoles of sodium sulfite per cubic millimeter in a volume of the liner to a depth of about 0.003 millimeters from a bottom surface of the liner. In yet another embodiment, the liner includes between about eight and about ten weight percent sodium sulfite. In still another embodiment, the liner includes between about eleven and about thirteen weight percent sodium sulfite.

In a third aspect, a method of manufacturing a crown system includes creating a crown that includes a top surface and a bottom surface; forming a liner that includes an oxygen scavenger and a top surface that contacts the bottom surface of the crown; and printing on a bottom surface of the liner with a pigment-based ink. In certain embodiments, the pigment-based ink is a direct food contact ink. In other certain embodiments, the liner includes at least about 2.2 micromoles of sodium sulfite per cubic millimeter in a volume of the liner to a depth of about 0.003 millimeters from a bottom surface of the liner. In yet another embodiment, the liner includes at least about six weight percent sodium sulfite and less than about eighteen weight percent sodium sulfite.

In a fourth aspect, a method of pasteurizing a container includes providing a container including a crown and a liner and containing a malt beverage, wherein the liner contains at least about 2.2 micromoles of sodium sulfite per cubic millimeter in a volume of the liner to a depth of about 0.003 millimeters from a bottom surface of the liner, wherein the container has an original total package oxygen of less than about 1000 ppb oxygen prior to pasteurization; and pasteurizing the container. In some embodiments, the total package oxygen is measured no later than 60 minutes after pasteurization and is less than about 90 percent and more than about 45 percent of the original total package oxygen. In certain embodiments, at about 15 minutes after pasteurization the total package oxygen of the container is less than about 90 percent and more than about 45 percent of the original total package oxygen. In certain embodiments, pasteurizing the container lasts between about 30 minutes and about 60 minutes. In certain other embodiments, the method includes absorbing between about 10 and 55 percent of the original total package oxygen into the liner during pasteurization. In some embodiments, the container includes an original total package oxygen of less than about 100 ppb oxygen. In certain embodiments, the container includes an original total package oxygen of less than about 60 ppb oxygen.

Other aspects, features, and advantages will become apparent from the following detailed description when taken in conjunction with the accompanying drawings, which are part of this disclosure and which illustrate, by way of example, principles of the inventions disclosed.

Other aspects, features, and advantages will become apparent from the following detailed description when taken in conjunction with the accompanying drawings, which are part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 3:
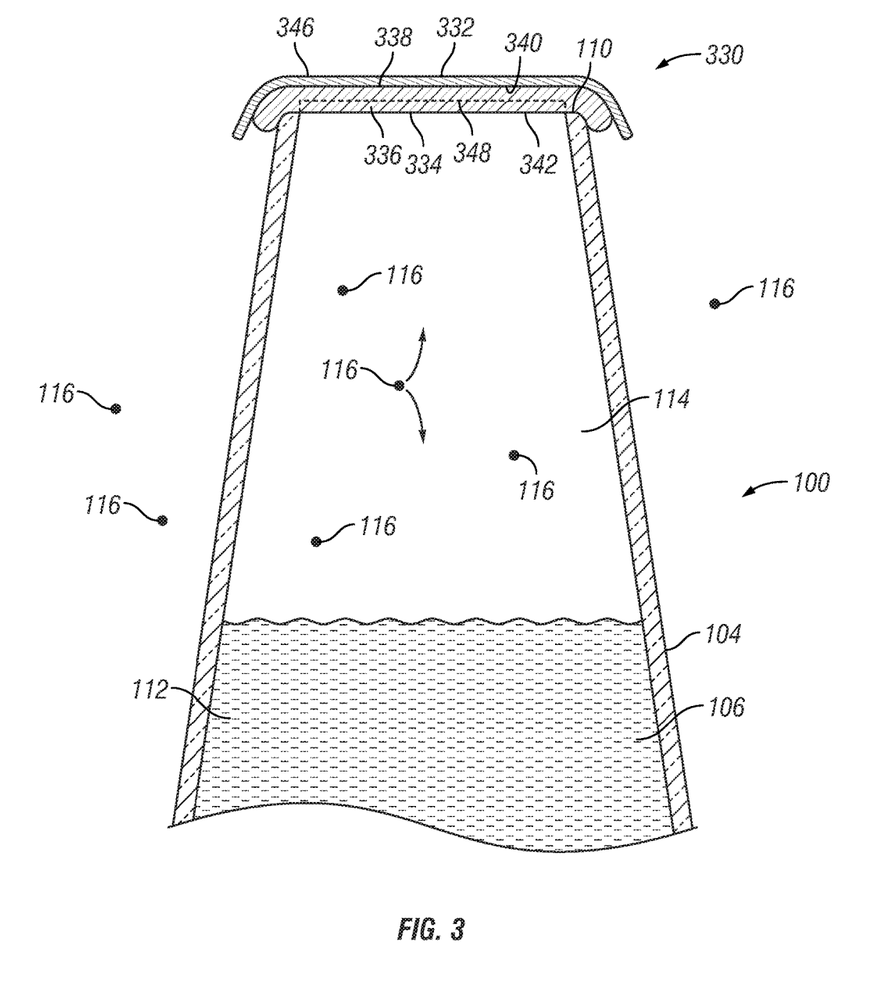
FIG. 3 is a magnified, sectional side view of a container including a crown and a liner.

Referring to FIG. 3, an improved liner system 330 includes a crown 332 with a liner 334 that includes at least about 2.2 micromoles of sodium sulfite per cubic millimeter in a permeability zone 336 of the liner 334. As will be described in more detail below, the improved liner system 330 causes the oxygen 116 in the container 100 that contains less than about 1000 ppb oxygen 116 after bottling and prior to pasteurization, to be reduced by at least about 10 percent and up to about 55 percent during pasteurization, as measured within about 1 hour after pasteurization.

As described above, during bottling, pasteurization, shipment, storage and other handling procedures, the liquid 112 within the container 100 is exposed to gasses in the headspace 114. Oxygen 116 is a gas commonly found in the headspace 114 that is known to have a deleterious effect on many fluids, including, for example, beer. It is known that beer will absorb oxygen 116 that is contained in the headspace 114. Once the oxygen 116 has been absorbed, it will react over time with various compounds in the beer to deteriorate the color and taste of the beer, thereby reducing the shelf life of the beer. Thus, it is advantageous to remove oxygen 116 from the headspace 114 before the oxygen 116 is absorbed into the beer and reacts with compounds in the beer.

It has been found, however, that oxygen 116 that is absorbed into the beer prior to pasteurization, and that has not yet reacted with compounds in the beer, is released into the headspace 114 during pasteurization. Thus, the amount of oxygen 116 in the headspace 114 increases during pasteurization as oxygen 116 is released by the beer into the headspace 114. Thus, pasturization presents an opportunity to remove the oxygen 116 that was previously absorbed into the beer from the headspace 114. The liner 334 is designed to absorb an increased amount of oxygen 116 during pasturization to take advantage of this time when the beer has released oxygen 116 that was previously absorbed into the beer.

The liner 334 is shown in FIG. 3 connected to a crown 332 that is disposed on the container 100. The container 100 may be made of any suitable material or mixture of materials, such as, for example, glass, plastic or metal, and the crown 332 may also be made of any suitable material or mixture of materials, such as, for example, metal or plastic. In addition, the crown 332 is any type of container closing mechanism that is made of any suitable material. Although a typical metal crown 332 is shown in FIG. 3, any suitable type of container closing mechanism may be used as the crown 332. For example, in the embodiment shown in FIG. 3, the crown 332 is a metal crown 332 such as those typically found on beer bottles. In some embodiments, the crown 332 is threaded onto the top portion 110 of the neck 104, such as in a screw-on, screw-off lid for a plastic water bottle or aluminum beer bottle. In other embodiments, the crown 332 is crimped onto the top portion 110 of the neck 104.

The container 100 may also be any suitable type of container 100, such as, for example, a metal container, glass container or plastic container. In some embodiments, the container 100 is a glass bottle similar to a typical beer bottle. In some embodiments, the container 100 is an aluminum bottle. In other embodiments, the container 100 is a plastic bottle similar to a typical soda bottle or water bottle. The container 100 may also be any size. For example, in one embodiment, the container 100 includes 12 ounces of liquid, such as in a typical beer bottle. In some embodiments, the container 100 includes 16 ounces of liquid.

The liner 334 includes a top surface 338 that is connected to a bottom surface 340 of the crown 332 and a bottom surface 342 that is in contact with the headspace 114. Thus, the bottom surface 342 of the liner 334 is in contact with the oxygen 116 that is in the headspace 114 of the container 100. In order to remove oxygen 116 from the headspace 114, the liner 334 is made of an oxygen permeable material and includes an oxygen scavenger, such as, for example, sodium sulfite, in a permeability zone 336 of the liner 334. The sodium sulfite reacts with oxygen 116 that permeates into the liner 334 to hold the oxygen 116 in the liner 334. The sodium sulfite may be micronized so that the diameter of the particles of sodium sulfite ranges from about 20 to about 80 micrometers.

The permeability zone 336 of the liner 334 is a volume of the liner 334 that begins at the bottom surface 342 of the liner 334 and extends into the liner 334 (from the bottom surface 342 of the liner 334 towards the top surface 338 of the liner 334) to a depth equal to the distance that oxygen 116 typically travels through the liner 334 during pasturization. In some embodiments, the liner 334 is oxygen permeable at a rate between about 0.013 micrometer per day and about 1.7 micrometer per day before pasteurization. Due to the short period of time in the bottling process between sealing the container 100 and pasturization, oxygen 116 from the headspace 114 typically permeates through the liner 334 to a depth of between about 0.0001 micrometers and about 0.0003 micrometers before pasteurization.

During pasteurization, the permeability rate of the liner 334 is greatly increased to between about 0.058 micrometers per minute and about 0.58 micrometers per minute due to the increased temperatures encountered during pasteurization. Depending on the total time the container 100 is being pasteurized, oxygen 116 from the headspace 114 permeates through liner 334 to a depth of between about 0.017 micrometers and about 2.98 micrometers during pasteurization. Thus, in some embodiments, the permeability zone extends to a depth of about 0.003 millimeters from the bottom surface 342 of the liner 334 towards the top surface 338 of the liner 334. The permeability zone 336 may include a safety factor and may extend past the expected permeability depth of oxygen 116 into the liner 334. In the example embodiment above, for example, the permeability zone 336 may extend to about 0.0035 millimeters. The permeability zone 336 may extend much further in some embodiments depending on the desired safety factor. In some embodiments, the permeability zone 336 may encompass the entire depth of the liner 334. In some embodiments, the permeability zone 336 is also bounded by the inner circumference of the bottle opening 122, as generally shown by the dashed line 348 in FIG. 3.

The liner 334 includes at least about 2.2 micromoles of sodium sulfite per cubic millimeter in the permeability zone 336, which is effective to produce an oxygen 116 concentration in the headspace 114, as measured within about one hour after pasteurization, that has been reduced by at least about 10 percent and up to about 55 percent of the initial total package oxygen before pasteurization. In the case of beer, the liner 334 increases the shelf life of beer compared with containers 100 of beer that do not include the liner 334. Oxygen scavengers outside of the permeability zone 336 have little effect on the absorption of oxygen 116 by the liner 334 during pasteurization because oxygen 116 does not typically permeate outside of the permeability zone 336 during pasturization.

The oxygen scavenger in the permeability zone 336 is most likely to come into contact with oxygen 116 from the headspace 114 during pasteurization due to the inability of the oxygen 116 to permeate past the permeability zone 336 before pasteurization is completed. As described above, the liner 334 is designed to have sufficient oxygen scavenger in the permeability zone 336 so that an increased amount of oxygen 116 can be removed from the headspace 114 during pasteurization, which is when the beer has released substantially all of the oxygen 116 that was absorbed prior to pasteurization and that had not reacted with compounds in the beer. Between about 2.2 micromoles and 13.2 micromoles of sodium sulfite per cubic millimeter in the permeability zone has been found to absorb an increased amount of oxygen 116 before pasteurization is complete, without causing negative side effects that can accompany higher concentrations of sodium sulfite in the liner 334.

Of course, oxygen scavenger may also be included in the volume of the liner 334 outside of the permeability zone 336, if any. Oxygen 116 from the atmosphere surrounding the container 100 may attempt to enter the headspace 114 by passing between the crown 108 and the container 100 and through the volume of the liner outside of the permeability zone 336. The oxygen scavenger that is outside of the permeability zone 336 can help absorb this atmospheric oxygen 116 as it attempts to move through the liner 334 so that it does not reach the headspace 114.

In one example embodiment, beer is sealed into the container 100 approximately 2 minutes before entering the pasteurizer. During the time between sealing and pasteurization, the beer has a low absorption rate of oxygen 116 which is typically between about 0.005 ppb per minute and about 0.015 ppb per minute. When the container 100 enters the pasteurizer, the temperature of the beer in the container 100 rises to approximately 140 degrees Fahrenheit in approximately 15 minutes to 30 minutes and is held at that temperature for approximately 15 minutes to 20 minutes. During the time in which the beer is heated, oxygen 116 escapes from the beer into the headspace until substantially all the oxygen 116 that was dissolved in the beer that had not yet reacted with compounds in the beer is located in the headspace 114. Once pasteurization is complete, the beer is cooled to approximately 75 degrees Fahrenheit and the absorption rate of oxygen 116 into the beer returns to between about 0.005 ppb per minute and about 0.015 ppb per minute. The oxygen 116 remaining in the headspace 114 will then either slowly redissolve back into the beer, at a rate of approximately 5 ppb and 15 ppb per day, or be absorbed by the liner 334.

In view of the foregoing, the liner 334 described above has been designed to increase absorption of oxygen 116 into the liner 334 during pasturization, when the beer has released oxygen into the headspace 114, so that less oxygen 116 is available for absorption back into the beer after pasteurization. As described above, substantially all oxygen 116 that has not already reacted with compounds in the beer is released from the beer into the headspace 114 during pasteurization. Thus, the liner 334 is designed to have sufficient oxygen scavenger in the permeability zone 336 to absorb between about 10 and about 55 percent of initial total package oxygen during pasteurization. After pasteurization is completed and the beer returns to its normal rate of oxygen absorption, less oxygen 116 is available in the headspace 114 for the beer to absorb because a portion of the oxygen 116 has already been absorbed by the liner 334 during pasturization.

The above recited permeability rates of oxygen 116 through the liner 334 correspond to the base formula for the liner 334 described below. The current base formula is shown in the table below, exclusive of sodium sulfite:

| Component | Weight Percent |
|---|---|
| Blowing Agent - OBSH/C | 0.25 |
| Blowing Agent - Bicarbonate/Citric Acid/H | 1.1 |
| Lube | 1.1 |
| Stabilizer | 0.4 |
| PVC | 54.9 |
| Plasticizer - DOTP - 168 | 39.5 |
| Epoxidized soybean oil | 2.75 |

Many base formulae for liners 334 are known in the art and other suitable base formulae for liners 334 having other permeability rates may be used in the liner 334 and are included within the scope of this disclosure. Thus, this disclosure is not limited to the base formula for a liner 334 that is listed above, but rather many other base formula for the liner 334 may be used and are included in this scope of this disclosure. For example, in some embodiments, the base formula for the liner 334 may include ethylene, methyl acrylate copolymer or any other suitable type of polymer. In addition, weight percentages other than those listed above may be used as a suitable base formula. In some embodiments, the base formula for the liner 334 includes Elvaloy®, which is made by DuPont®. In other embodiments, the base formula for the liner 334 includes EVA.

In some embodiments, the permeability zone 336 combines at least six weight percent and less than eighteen weight percent sodium sulfite with the preferred base formula given above. For example, 94 kilograms of the base formula combined with 6 kilograms of sodium sulfite would be the minimum sodium sulfite concentration in some embodiments. Other advantageous compositions include 9 or 12 weight percent sodium sulfite, respectively. These formulations have been found to absorb an increased amount of oxygen 116 from the headspace 114 during pasteurization, while still avoiding negative effects associated with higher concentrations of sodium sulfite.

As described above, it has also been discovered that excessive sodium sulfite in the liner 334 in amounts greater than eighteen weight percent has negative effects on the liquid 112 in the container 100 and on the liner 334. It has been discovered that a permeability zone 336 having six weight percent or greater sodium sulfite and less than eighteen weight percent sodium sulfite in the permeability zone 336 significantly reduces the oxygen 116 in the headspace 114 during pasteurization while avoiding problems associated with previous attempts to further reduce oxygen 116 in the headspace 114. It has also been discovered that including between about thirteen weight percent and about eighteen weight percent sodium sulfite provides no significant additional reduction in oxygen 116 in the headspace 114 compared to the reduction in oxygen 116 in the headspace 114 achieved with between about six and about twelve weight percent sodium sulfite. Other operable weight percents of sodium sulfite in the permeability zone include between about eight to about ten weight percent sodium sulfite and between about eleven to about thirteen weight percent sodium sulfite.

In some embodiments, the bottom surface 342 of the liner 334 is also texturized (not shown) to increase the surface area of the bottom surface 342 and thus to increase the number of oxygen scavenger particles that are more directly accessible to oxygen 116 in the headspace 114 without the need to permeate deeply into the permeability zone 336. In some embodiments, for example, the bottom surface 342 of the liner 334 includes ridges and/or grooves to increase the surface area of the bottom surface 342. Thus, the surface area that comes into contact with the headspace 114 is increased and the number of oxygen scavenger particles that are more directly accessible at the bottom surface 342 of the liner 334 is increased. In some embodiments, the amount of oxygen scavenger in the liner 334 can be decreased while still achieving the same oxygen 116 reduction effect in the headspace 114 due to the increase in surface area of the bottom surface 342 of the liner 334.

Figure 4:
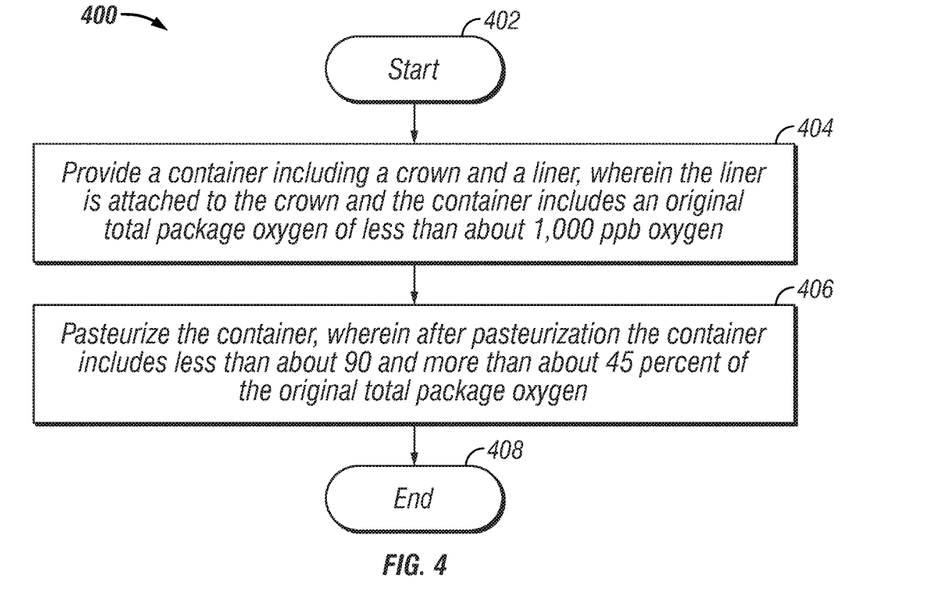
FIG. 4 is a schematic view of a method of pasteurizing a container including a crown.

FIG. 4 shows an embodiment of a pasteurization process 400 in accordance with this disclosure. The process 400 begins 402 and a container 100, including a crown 332 and a liner 334, is provided 404. The liner 334 is attached to the crown 332 and the headspace 114 is disposed between the liner 334 and a liquid 112 disposed in the container 100. In some embodiments, the liquid 112 is a malt beverage, such as beer. The container 100 includes less than about 1000 ppb oxygen 116 and the liner 334 contains at least about 2.2 moles of sodium sulfite per cubic millimeter in a volume of the liner 334 to a depth of about 0.003 millimeters from a bottom surface 342 of the liner 334. The container 100 is then pasteurized 406. After pasteurization, the total package oxygen in the container 100 is typically measured within about 15 minutes of pasteurization and usually no later than 1 hour after pasteurization. In some embodiments, the total package oxygen is less than about 90 percent and more than about 45 percent of the original total package oxygen when the total package oxygen is measured no later than 60 minutes after pasteurization. In some embodiments, the total package oxygen in the container 100 at about 15 minutes after pasteurization is less than about 90 and more than about 45 percent of the original total package oxygen in the container 100. The method 400 then ends 408.

Referring again to FIG. 2, manufacturers often place advertisements, logos or other printed material 124 on an underside of the crown 108 or between layers of a liner 118 so that the printed material 124 is visible to a user when the crown 332 is removed from the container 100. In the case of a liner 334 containing an oxygen scavenger, when the oxygen scavenger in the liner 334 absorbs oxygen 116, some or all of the liner 334 may become opaque and may prevent a user from viewing the printed material 124 under the liner 334. For example, sodium sulfite contained in the liner 334 may react with oxygen 116 to form sodium sulfate. The sodium sulfate in the liner 334 may make some or all of the liner 334 opaque. As such, printed material 124 on the crown 332, a lacquer covering the crown 332 or between layers of a liner may be difficult or impossible to see when the crown 332 is removed from the container 100.

In addition, current crown manufacturers have used water-based or alcohol/solvent-based inks for printing on the crown 332 itself, a lacquer covering the crown 332 or between layers of a liner because a barrier is needed between these inks and the liquid to prevent the inks from washing off and/or leaching into the liquid 112 in the container 100. It has been found, however, that food-grade, pigment-based inks may be safely and clearly printed directly on the bottom surface 342 of the liner 334 and that printed material 124 using food-grade, pigment-based inks will retain clarity after coming into contact with a liquid 112 in the container 100. In particular, it has been found that food-grade, pigment-based inks may be safely and clearly printed on the bottom surface 342 of the present liner 334 which includes oxygen scavengers and which may come into contact with alcoholic beverages, such as beer.

It has also been found that food-grade, pigment-based inks may also be used to print directly on a bottom surface of other liners that contain oxygen scavengers, as well as other liners that do not contain oxygen scavengers. In addition, it has been found that food-grade, pigment-based inks may be printed directly on a bottom surface of a liner that may come into contact with alcoholic and non-alcoholic beverages. One example of a food-grade, pigment-based ink is the Non-tox Edimark® ink manufactured by Colorcon, Chalfont, Pa., USA.

Figure 5:
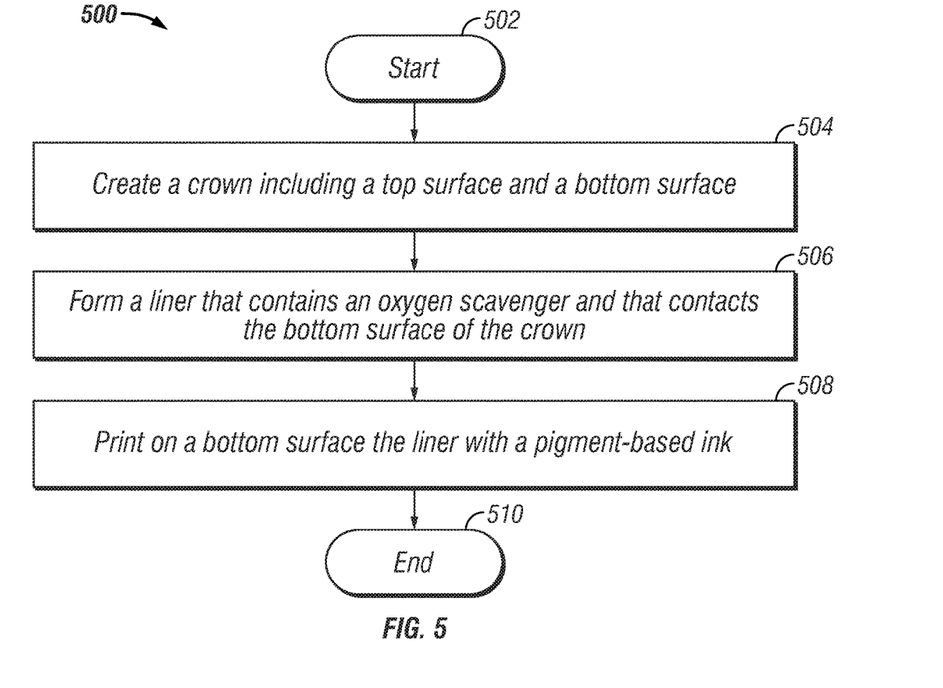
FIG. 5 is a schematic view of a method of manufacturing a crown system.

FIG. 5 depicts a method 500 of manufacturing a crown system that includes printing on the liner 334. The method 500 begins 502 and a crown 332 is created 504 that includes a top surface 346 and a bottom surface 340. A liner 334 that includes an oxygen 116 scavenger is then formed 506 that contacts the bottom surface 340 of the crown 332. A pigment-based ink is then printed on a bottom surface 342 of the liner 334. In some embodiments, the pigment-based ink is a direct food contact ink. In some embodiments, the liner 334 includes at least about 2.2 micromoles of sodium sulfite per cubic millimeter to a depth of about 0.003 millimeters from a bottom surface 342 of the liner 334. In some embodiments, the liner 334 includes at least six weight percent sodium sulfite and less than eighteen weight percent sodium sulfite in the permeability zone 336.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below," "top" and "bottom" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A sealing closure for a beverage container, comprising:
   a crown defining a bottom surface;
   a liner comprising an oxygen scavenger coupled to the crown such that a top surface of the liner contacts the bottom surface of the crown, the liner being formed by molding a deformable, resilient material; and
   printed indicia on a bottom surface of the liner, the printed indicia formed by applying an ink to the bottom surface of the liner, the crown and the liner being configured to seal a beverage container containing a beverage such that the bottom surface of the liner and the printed indicia are exposed to the beverage.

2. The system of claim 1, wherein the ink is a pigment-based ink.

3. The system of claim 1, wherein the ink is a direct food contact ink.

4. The system of claim 1, wherein the liner comprises at least about 2.2 micromoles of sodium sulfite per cubic millimeter in a volume of the liner to a depth of about 0.003 millimeters from the bottom surface of the liner.

5. The system of claim 1, wherein the liner comprises at least about six weight percent sodium sulfite and less than about eighteen weight percent sodium sulfite.

6. The system of claim 1, wherein the bottom surface of the liner includes a texture to increase a surface area of the bottom surface of the liner.

7. The system of claim 1, wherein the liner further comprises a base formula comprising PVC, a plasticizer, a stabilizer and a blowing agent.

8. The system of claim 1, wherein the oxygen scavenger is sodium sulfite.

9. The system of claim 8, wherein the sodium sulfite is micronized so that diameters of particles of the sodium sulfite range from about 20 to about 80 micrometers.

10. The system of claim 8, wherein the liner comprises between about eight and about ten weight percent sodium sulfite.

11. The system of claim 8, wherein the liner comprises between about eleven and about thirteen weight percent sodium sulfite.

12. A sealed beverage container, comprising:
    a container containing a malt beverage;
    a crown;
    a liner comprising an oxygen scavenger affixed to the crown, the liner being formed by molding a deformable, resilient material;
    printed indicia disposed on a bottom surface of the liner, wherein the printed indicia is formed by applying ink to the bottom surface of the liner; and wherein the crown and the liner are coupled to the container and sealing the malt beverage within the container such that the bottom surface of the liner and the printed indicia are exposed to the malt beverage.

13. The system of claim 12, wherein an original total package oxygen of the container containing the malt beverage is less than about 1000 ppb oxygen.

14. The system of claim 12, wherein an original total package oxygen is less than about 100 ppb oxygen.

15. The system of claim 14, wherein the original total package oxygen is less than about 60 ppb oxygen.

* * * * *